United States Patent
Moruzzi

(10) Patent No.: US 6,994,002 B2
(45) Date of Patent: Feb. 7, 2006

(54) END PREP TOOL AND TOOL CENTERING AND MOUNTING SYSTEM FOR USE THEREWITH

(75) Inventor: James Moruzzi, Sherborn, MA (US)

(73) Assignee: Esco Technologies, Inc., Medfield, MA (US)

( * ) Notice: Subject to any disclaimer, the term of this patent is extended or adjusted under 35 U.S.C. 154(b) by 229 days.

(21) Appl. No.: 10/400,221

(22) Filed: Mar. 27, 2003

(65) Prior Publication Data

US 2004/0187658 A1 Sep. 30, 2004

(51) Int. Cl.
*B23B 3/00* (2006.01)

(52) U.S. Cl. .............................. 82/123; 82/113; 408/79; 408/80; 33/644; 33/520

(58) Field of Classification Search .................. 82/113, 82/123; 408/79, 80; 409/178, 179; 33/520, 33/644, 543, 544.1, 555.1
See application file for complete search history.

(56) References Cited

U.S. PATENT DOCUMENTS

| | | | |
|---|---|---|---|
| 3,772,944 A | * 11/1973 | Becker et al. | 82/113 |
| 3,807,047 A | * 4/1974 | Sherer et al. | 30/97 |
| 4,397,202 A | 8/1983 | Mayfield et al. | |
| 4,437,366 A | * 3/1984 | Astle | 82/113 |
| 4,483,223 A | 11/1984 | Nall et al. | |
| 4,493,232 A | 1/1985 | Nall | |
| 4,665,782 A | * 5/1987 | Vander Pol | 82/113 |
| 4,677,884 A | * 7/1987 | Kwech et al. | 82/113 |
| 4,824,301 A | * 4/1989 | Martin | 409/179 |
| 4,981,055 A | * 1/1991 | VanderPol et al. | 82/113 |
| 5,189,933 A | * 3/1993 | Ricci | 82/113 |
| 5,777,562 A | 7/1998 | Hoffman | |
| 5,881,618 A | 3/1999 | Ricci et al. | |
| 6,050,161 A | * 4/2000 | Tremblay | 82/113 |
| 6,189,425 B1 | * 2/2001 | Ricci et al. | 82/113 |
| 6,202,522 B1 | * 3/2001 | Tremblay | 82/113 |
| 6,220,130 B1 | 4/2001 | Beakley | |
| 6,309,145 B1 | * 10/2001 | Tremblay et al. | 408/1 R |
| 6,427,567 B1 | 8/2002 | Ricci et al. | |
| 6,447,220 B1 | * 9/2002 | Ricci et al. | 408/72 R |
| 6,536,316 B2 | * 3/2003 | Strait | 82/113 |
| 6,615,696 B2 | * 9/2003 | Ricci et al. | 82/113 |

OTHER PUBLICATIONS

Tri Tool Inc., "ID Mount Pipe Machining Equipment," catalog.
M.T.T. Machine Tech. Inc., "Shop-in-a-Box Portable Pipe Lathe," catalog.
D.L. Ricci Corp., "Portable Machining Systems," catalog.
D.L. Ricci Corp., "Model BU31P Plasma System," catalog.
D.L. Ricci Corp., "Rapid End Prep Series 626," catalog.
D.L. Ricci Corp., "Portable In-Place Machining Equipment and Technical Support Services," catalog.
ESCO Tool, "Portable End Prep Tools and Abrasive Saws," catalog.
CAR-BER Testing Services, "End Prep Lathe," Operating Instructions & Parts List.

* cited by examiner

*Primary Examiner*—Derris H. Banks
*Assistant Examiner*—Sara Addisu
(74) *Attorney, Agent, or Firm*—Devine, Millimet & Branch; Paul C. Remus; Michelle Saquet Temple

(57) ABSTRACT

An end prep tool is mounted in substantial alignment with a theoretical center of a pipe and used to prepare an end of a pipe, for example, by boring and/or cutting the end of the pipe. A tool centering and mounting system comprises a clamp cage and a tool mounting member having an inner cylindrical surface. A centering tool is mounted to the tool mounting member and used to adjust the tool mounting member until substantially aligned with the theoretical center of the pipe. The end prep tool comprises a tool feed assembly that moves a cutting tool radially with respect to the axis of rotation and axially according to a predefined cutting profile.

12 Claims, 6 Drawing Sheets

END PREP TOOL AND TOOL CENTERING AND MOUNTING SYSTEM FOR USE THEREWITH

TECHNICAL FIELD

The present invention relates to machine tools and more particularly, to an internally mounted end prep tool and a tool centering and mounting system for use therewith.

BACKGROUND INFORMATION

The use of internally mounted end prep tools is generally known in the art. End prep tools are typically used, for example, to prepare a pipe for welding by cutting, machining and/or beveling the end of the pipe. The conventional end prep tool mounts or clamps to the inside surface of the pipe with a mandrel having three expandable clamps spaced about 120° apart. The clamps generally expand simultaneously when pulled up a 15° taper by a draw rod. When used with a pipe or tube that is perfectly round, this type of conventional end prep tool is self-centering and mounts securely to the inside surface of the pipe.

In pipes or tubes of larger diameters (e.g., greater than 16 in.), however, the pipe roundness and wall thickness are usually inconsistent. A standard 24 in. schedule 120 pipe, for example, often has an egg shape and a wall thickness varying by as much as 50% from the expected thickness of 1.812 in. Because of the out of roundness in such large pipes, the conventional self-centering end prep tools typically clamp off-center. As a result, the surface that is prepared or machined is also off-center.

Another drawback of conventional end prep tools relates to the tool feed mechanism. The conventional end prep tool includes a star wheel that rotates a feed screw to advance a tool carriage. The star wheel rotates by engaging a structure on the tool housing as the tool rotates. The conventional star wheel often misaligns, causing the feed mechanism to jam and a failure of the tool to advance.

A further drawback of the conventional end prep tool is the difficulty of cutting certain types of bevels. With smaller pipes having thinner walls, a single bevel is used (e.g., a 37½° bevel on a ¾ in. wall thickness). On larger pipes having thicker walls, however, a compound bevel is often required (e.g., a 37½° to a 10° bevel). The conventional end prep tools have difficulty cutting a compound bevel because of the degree change in the middle of the prep.

Accordingly, there is a need for a tool centering and mounting system for mounting a tool substantially aligned with the theoretical center of a pipe having an inconsistent thickness and roundness. There is also a need for an internally mounted end prep tool for preparing the end of a pipe (e.g., by boring and/or cutting) with respect to the theoretical center of the pipe. There is a further need for an end prep tool capable of cutting a compound bevel more easily.

SUMMARY

In accordance with one aspect of the present invention, a tool centering and mounting system is provided for centering and internally mounting a tool at a theoretical center of a pipe. The system comprises a clamp cage including a central portion and at least three legs extending radially from the central portion with at least one of the legs being radially adjustable. A tool mounting member including a substantially cylindrical inside surface is adjustably mounted to the clamp cage. A centering tool is removably mounted to the tool mounting member. The centering tool includes a rotating arm having a rotational axis substantially aligned with a longitudinal axis of the cylindrical inside surface of the tool mounting member. A centering indicator is at an end of the arm for indicating a relative distance of an inside surface of the pipe with respect to the longitudinal axis of the tool mounting member.

According to another aspect, a method is provided for mounting a tool at a theoretical center of a pipe. The method comprises positioning a clamp cage inside of the pipe such that first and second legs of the clamp cage engage an inside surface of the pipe and adjusting a third leg of the clamp cage against the inside surface of the pipe. A tool-mounting member is positioned within the clamp cage and a centering tool is removably mounted to the tool-mounting member. At least one relative distance is measured from a longitudinal axis of the tool-mounting member to the inside surface of the pipe. The tool mounting member is adjusted until the longitudinal axis of the tool mounting member is substantially aligned with the theoretical center of the pipe, and the tool mounting member is mounted to the clamp cage. A mandrel of the tool is mounted to the tool mounting member such that a rotational axis of the tool is substantially aligned with the theoretical center.

According to a further aspect, a tool feed assembly is provided for use with an end prep tool for preparing an end face of a pipe. The tool feed assembly includes a base member for rotating about a rotational axis substantially aligned with a theoretical center of the pipe. A tool feed carriage is slidably mounted on the base member for moving radially with respect to the rotational axis. A feed screw is rotatably mounted to the base member and engages the tool feed carriage for advancing the tool feed carriage radially as the base member rotates. A ratchet mechanism engages the feed screw. The ratchet mechanism includes an arm for moving in a first direction to advance the ratchet mechanism and incrementally rotate the feed screw and for moving freely in a second direction without rotating the feed screw. A cutting template on the base member provides a predefined cutting profile, and a tool holder is movably mounted to the tool feed carriage and engages the cutting template such that the tool holder is moved according to the predefined profile.

According to yet another aspect, an end prep tool and mounting assembly is provided for use with a pipe having a theoretical center. The assembly comprises a clamp cage including a central portion and at least three legs extending radially from the central portion with at least one of legs being radially adjustable to contact an inside surface of the pipe. A tool mounting member includes a substantially cylindrical inside surface and is adapted to mount to the clamp cage such that a longitudinal axis of the cylindrical inside surface is substantially aligned with the theoretical center of the pipe. An end prep tool is mounted within the cylindrical inside surface of the tool mounting member such that a rotational axis of the end prep tool is substantially aligned with the theoretical center of the pipe.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
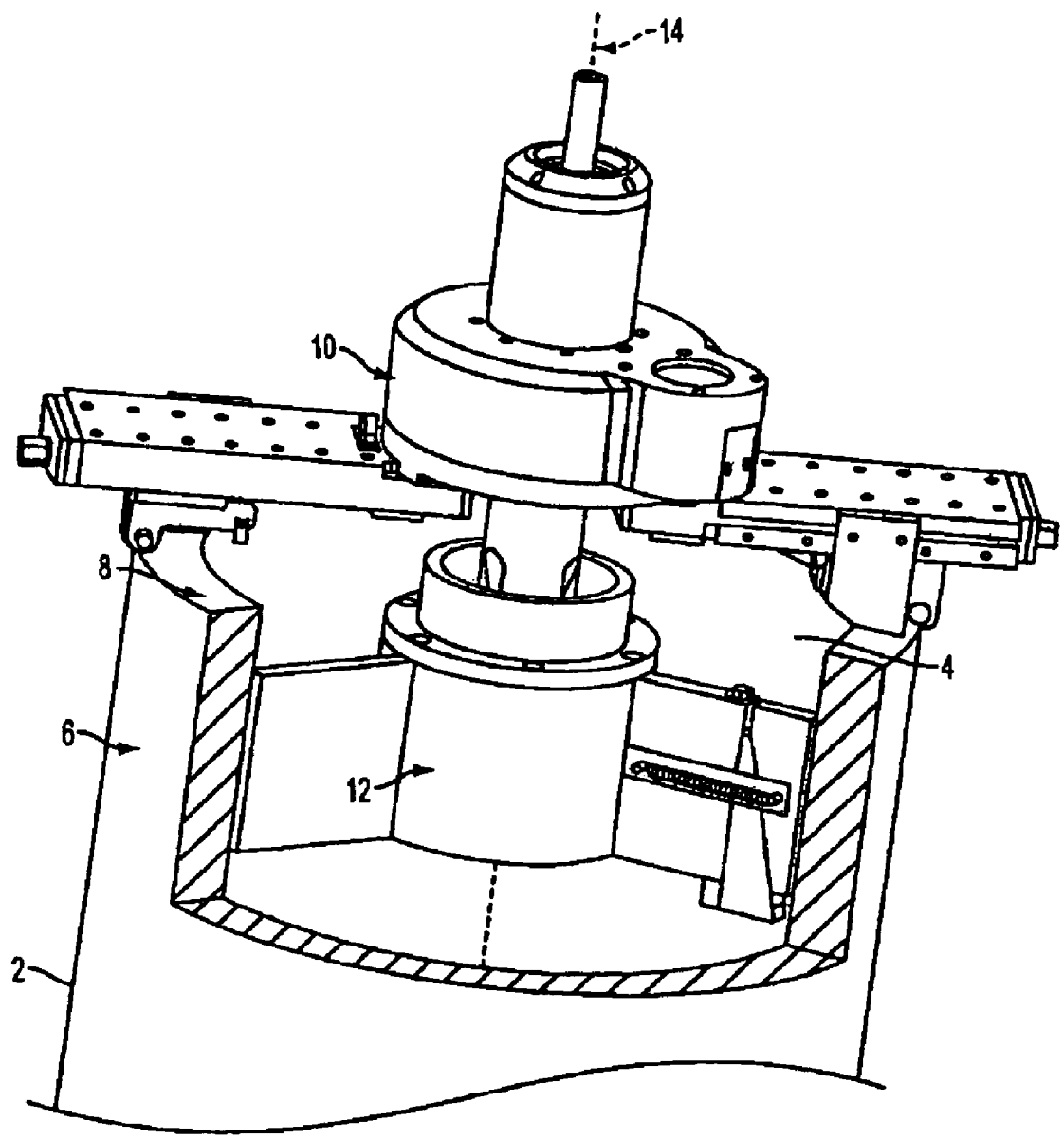
FIG. 1 is a perspective view of an end prep tool mounted and substantially aligned with a theoretical center of a pipe, according to one embodiment of the present invention.

Referring to FIG. 1, an end prep tool 10 is used to prepare the end of a pipe 2 having an inside surface 4, an outside surface 6 and an end faced 8. A tool centering and mounting system 12 is used to mount the end prep tool 10 such that the rotational axis 14 of the tool 10 is substantially aligned with the theoretical center of the pipe 2.

Figure 2:
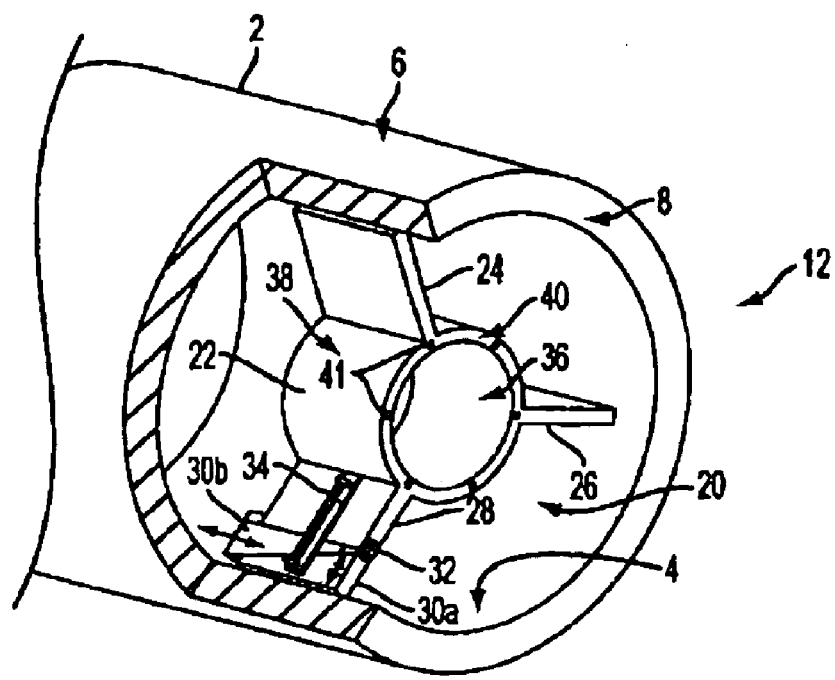
FIG. 2 is a perspective, partially cross-sectional view of a clamp cage, according to one embodiment of the present invention, clamped within the pipe.

Referring to FIG. 2, the tool centering and mounting system 12 includes a clamp cage 20, which is first mounted within the pipe 2. The clamp cage 20 includes a central portion 22 preferably having a substantially cylindrical shape and at least three legs 24, 26, 28 extending radially from the central portion 22. In one preferred embodiment, two of the legs 24, 26 are fixed in length such that the length of the legs 24, 26 is calculated to the inside diameter of the pipe 2 (assuming the pipe 2 is perfectly round).

The third leg 28 is radially adjustable to allow the clamp cage 20 to be easily inserted within the pipe 2 and adjusted to clamp against the inside surface 4 of the pipe 2. One embodiment of the radially adjustable leg 28 includes wedge pieces 30a, 30b having a matching taper, for example, of about 15°. A bolt 32 is turned causing the wedge piece 30b to ride up on the wedge piece 30a and forcing the wedge piece 30a outward to engage the inner surface 4. When the adjustable leg 28 is not clamped, a spring 34 or other biasing mechanism can be used to pull the wedge piece 30a inwardly and hold the adjustable leg 28 together.

The central portion 22 of the clamp cage 20 preferably has substantially concentric and parallel inside and outside surfaces 36, 38 and an end face 40 substantially perpendicular to the inside and outside surfaces 36, 38. In one embodiment, holes 41 extend through the end face 40 of the central portion 22 for receiving mounting bolts to mount a tool mounting member, as will be described in greater detail below. The clamp cage 20 can be made of carbon steel or other suitable materials. Although the exemplary embodiment shows one particular shape and configuration for the clamp cage 20, other shapes and configurations are contemplated.

Figure 3:
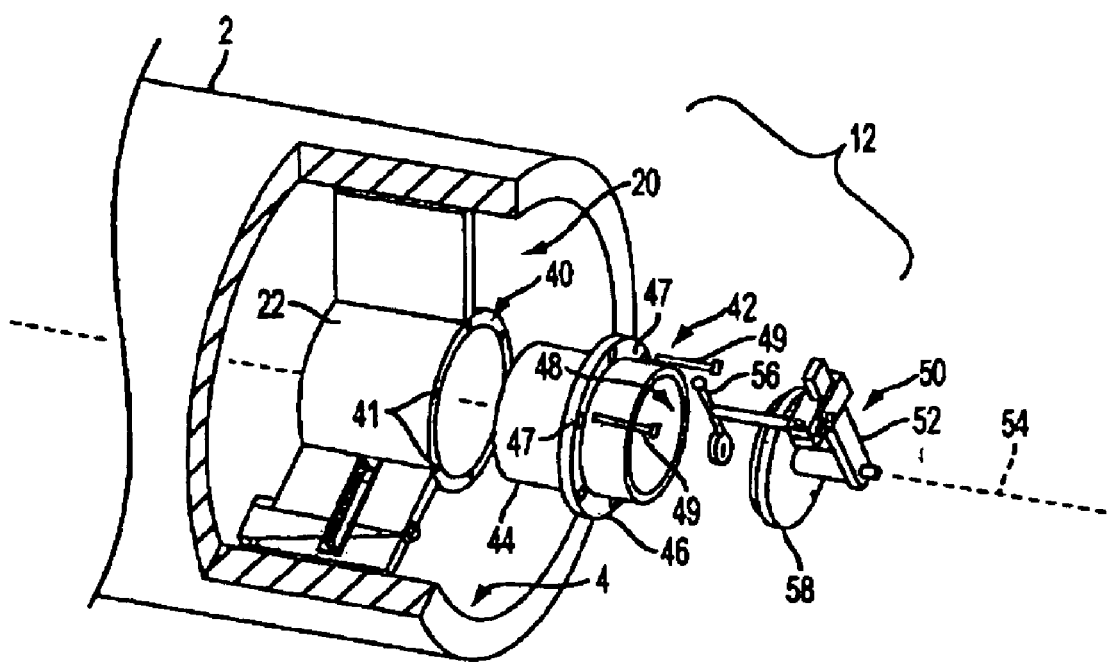
FIG. 3 is an exploded perspective view of a tool centering and mounting system, according to one embodiment of the present invention.

Referring to FIG. 3, the tool centering and mounting system 12 further comprises a tool mounting member 42 that is adjustably mounted to the clamp cage 20. The preferred embodiment of the tool mounting member 42 includes a substantially cylindrical portion 44 and a collar 46 extending around at least part of the cylindrical portion 44. At least part of the cylindrical portion 44 extends into the central portion 22 of the clamp cage 20 and the collar 46 is mounted against the end face 40 of the central portion 22. In one embodiment, mounting bolts 49 (only two are shown for purposes of clarity) extend through oversized holes 47 in the collar 46 and into the holes 41 in the central portion 22 of the clamp cage 20. The oversized holes 47 allow the tool mounting member 42 to be adjusted in multiple directions before tightening the mounting bolts. The tool mounting member 42 includes a substantially cylindrical inside surface 48 against which the end prep tool 10 can be mounted (see FIG. 1).

The tool mounting member 42 can be made of carbon steel or other suitable materials. Although the exemplary embodiment shows one particular shape and configuration for the tool mounting member 42, other shapes and configurations are contemplated.

A centering tool 50 is removably mounted to the tool mounting member 42. The centering tool 50 preferably includes a plate 58 that is mounted against the end face of the cylindrical portion 44 of the tool mounting member 42. The preferred embodiment of the centering tool 50 includes a rotating arm 52 rotatably mounted to the plate 58. The rotating arm 52 has a rotational axis 54 substantially aligned with a longitudinal axis of the cylindrical portion 44 of the tool mounting member 42. A centering indicator 56 is attached at the end of the rotating arm 52. The centering indicator indicates a relative distance of the rotational axis 54 with respect to the inside surface 4 of the pipe 2.

In use, the clamp cage 20 is first internally clamped within the pipe 2. In one example, the pipe has a diameter of 24 in. and a wall thickness of 2 in., although other pipe sizes and dimensions are contemplated. The fixed legs 24, 26 are positioned against the inside surface 4 of the pipe 2, and the adjustable leg 28 is adjusted until the clamp cage 20 is firmly clamped against the inside surface 4. Because of the variations in thickness and the out-of-roundness of the pipe 2, the longitudinal axis of the clamp cage 20 generally does not coincide with the theoretical center of the pipe 2.

The tool mounting member 42 is positioned within the central portion 22 of the clamp cage 20. The mounting bolts 49 are inserted through the oversized holes 47 and into the holes 41 in the clamp cage 20. Washers can be used with the mounting bolts 49 if needed to prevent the heads of the bolts 49 from entering the oversized holes 47. The mounting bolts 49 are hand tightened to hold the tool mounting member 42 against the clamp cage while allowing movement of the tool mounting member 42 in radial directions. The centering tool 50 is mounted to the tool mounting member 42 such that the rotational axis 54 is concentric with the center or longitudinal axis of the cylindrical inside surface 48 of the tool mounting member 42.

To adjust the tool mounting member 42 to substantially align with the theoretical center of the pipe 2, the arm 52 of the centering tool 50 is rotated with an end of the indicator 56 in contact with the inner surface 4 of the pipe 2. According to one method, the indicator 56 is used to take measurements at two points on the inside surface 4 spaced 180° apart. If the measurements are different, the tool mounting member 42 is moved in a direction along the line connecting the two points until the measurements taken at the two points are substantially equal. The arm 52 is then rotated 90°, and the process is repeated for two additional points spaced 180° apart. When the indicator measurements are substantially equal at all of the points measured on the inside surface 4 of the pipe 2, the rotational axis 54, and thus the center or longitudinal axis of the tool mounting member 42, is substantially aligned with the theoretical center of the pipe 2.

The mounting bolts 49 can then be tightened down to securely mount the tool mounting member 42 to the clamp cage 20. The centering tool 50 is then removed to allow the end prep tool 10 to be mounted. Although the end prep tool 10 is mounted to the tool centering and mounting system 12 in the exemplary embodiment described in greater detail below, the tool centering and mounting system 12 can also be used to center and mount other types of tools.

Figure 4:
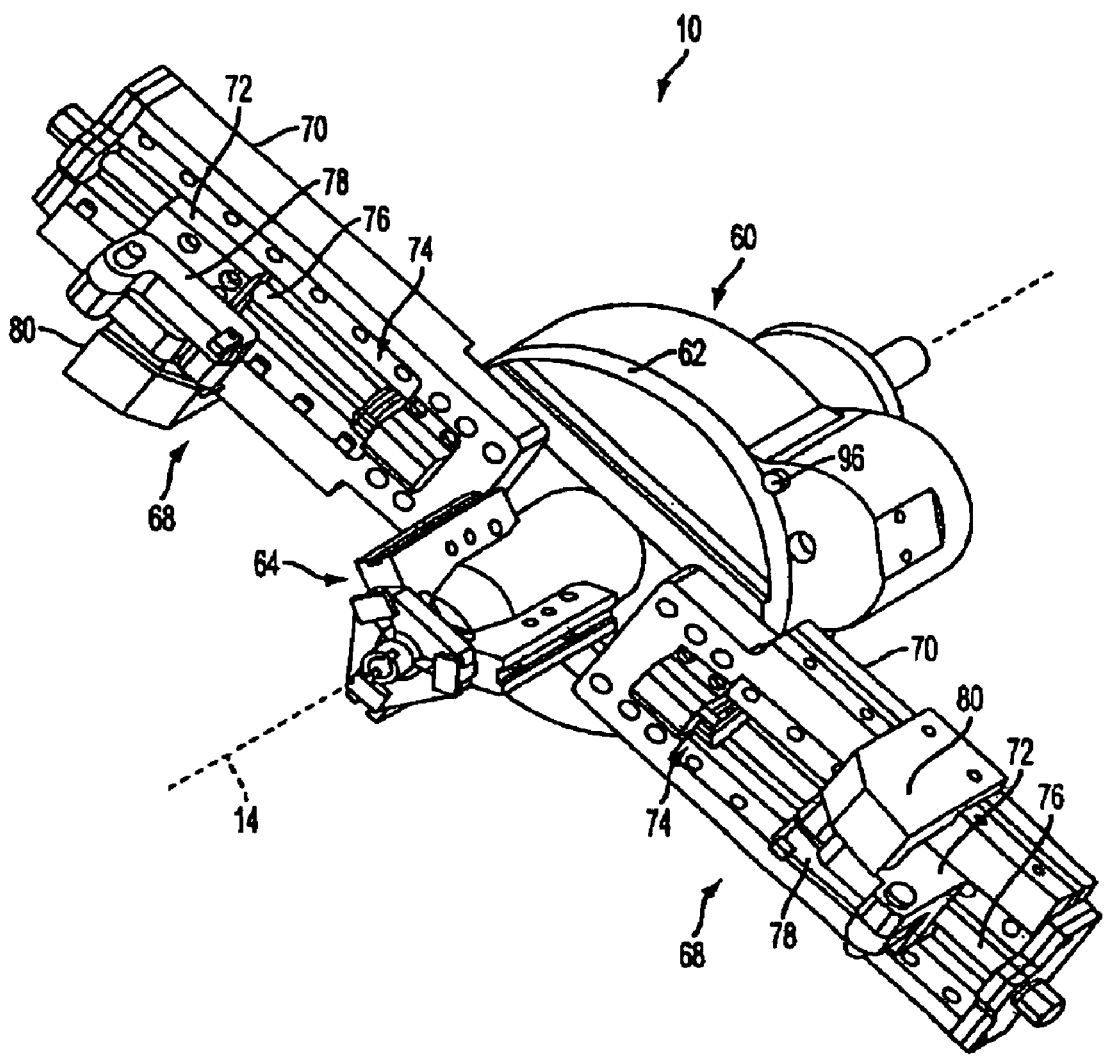
FIG. 4 is a perspective view of one embodiment of the end prep tool, according to one embodiment of the present invention.

Referring to FIG. 4, one embodiment of the end prep tool is described in greater detail. The end prep tool 10 includes a housing 60 containing a tool drive mechanism, such as the type used in the end prep tool available from Esco Tool, Inc. under the name "DICTATOR" MILLHOG®. A mandrel assembly 64 extends from the housing 60 and is adapted to mount within the tool mounting member 42 described above. The mandrel assembly 64 is preferably a self-centering mandrel assembly, such as the type used on the tools available from Esco Tool, Inc.

One or more tool feed assemblies 68 are supported on a cutterhead 62, which is coupled to the tool drive mechanism. Although the exemplary embodiment shows two tool feed assemblies 68, the end prep tool 10 can also include only one tool feed assembly or more than one tool feed assembly. In the exemplary embodiment, the tool feed assembly 68 performs single point beveling of the end face 8 of the pipe 2 (see FIG. 1) as the tool rotates about the rotational axis 14.

Figure 5:
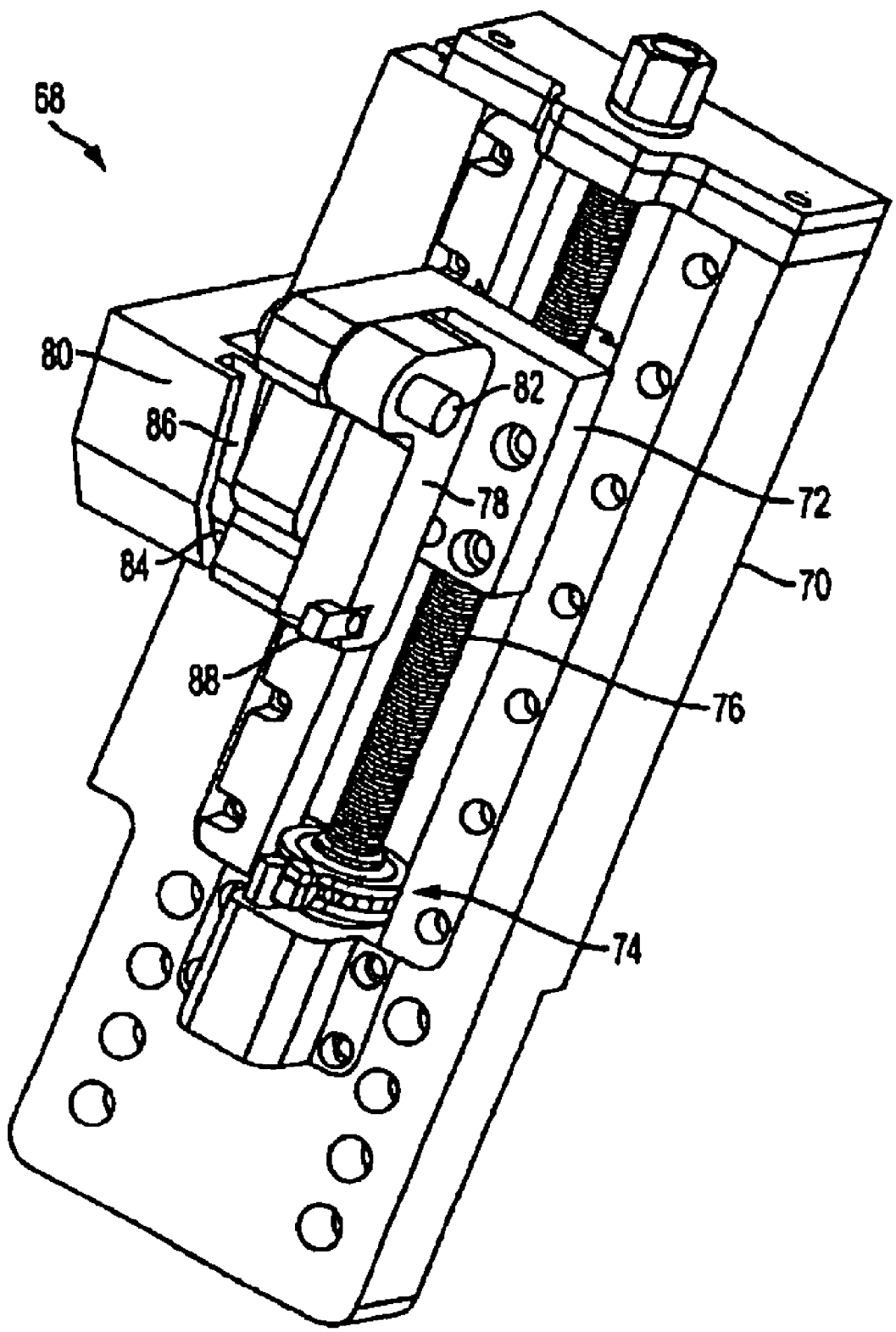
FIG. 5 is a perspective view of a tool feed assembly, according to one embodiment of the present invention.

One embodiment of the tool feed assembly 68 is shown in greater detail in FIG. 5. The tool feed assembly 68 includes a base member 70 that rotates about the rotational axis 14, which is substantially aligned with the theoretical center of the pipe 2 (see FIG. 1). A tool feed carriage 72 is slidably mounted to the base member 70 and moves radially with respect to the rotational axis 14. A feed screw 76 is rotatably mounted to the base member 70 and engages the tool feed carriage 72 for advancing the tool feed carriage 72 radially as the base member 70 rotates. A tool holder 78 is movably mounted to the tool feed carriage 72 and engages a cutting template 80 on the base member 70 to provide movement in the axial direction in accordance with a predefined cutting profile. In one example, the predefined cutting profile provided by the template 80 corresponds to a compound bevel to be cut in the end face 8 of the pipe 2. Thus, the use of the template 80 facilitates the cutting of more complicated cutting profiles in the end of the pipe 2 and also facilitates changing of the cutting profile (e.g., changing the angle of the compound bevel) by just changing the template 80.

In the preferred embodiment, the tool holder 78 is a tool holder arm pivotably mounted on the tool carriage 72 with a pivot pin 82. The pivot pin 82 can include a castle nut for adjusting the drag on the tool holder arm 78. A guide pin 84 extends from the tool holder arm 78 and rides in a groove 86 in the cutting template 80 as the tool holder 78 pivots about the pivot pin 82. The groove 86 provides the predefined cutting profile. A cutter blade or insert 88 is mounted in the tool holder 78 using conventional techniques. The cutter blade or insert 88 can be any conventional cutting blade or insert such as the type available from Esco Tool, Inc.

Figure 6:
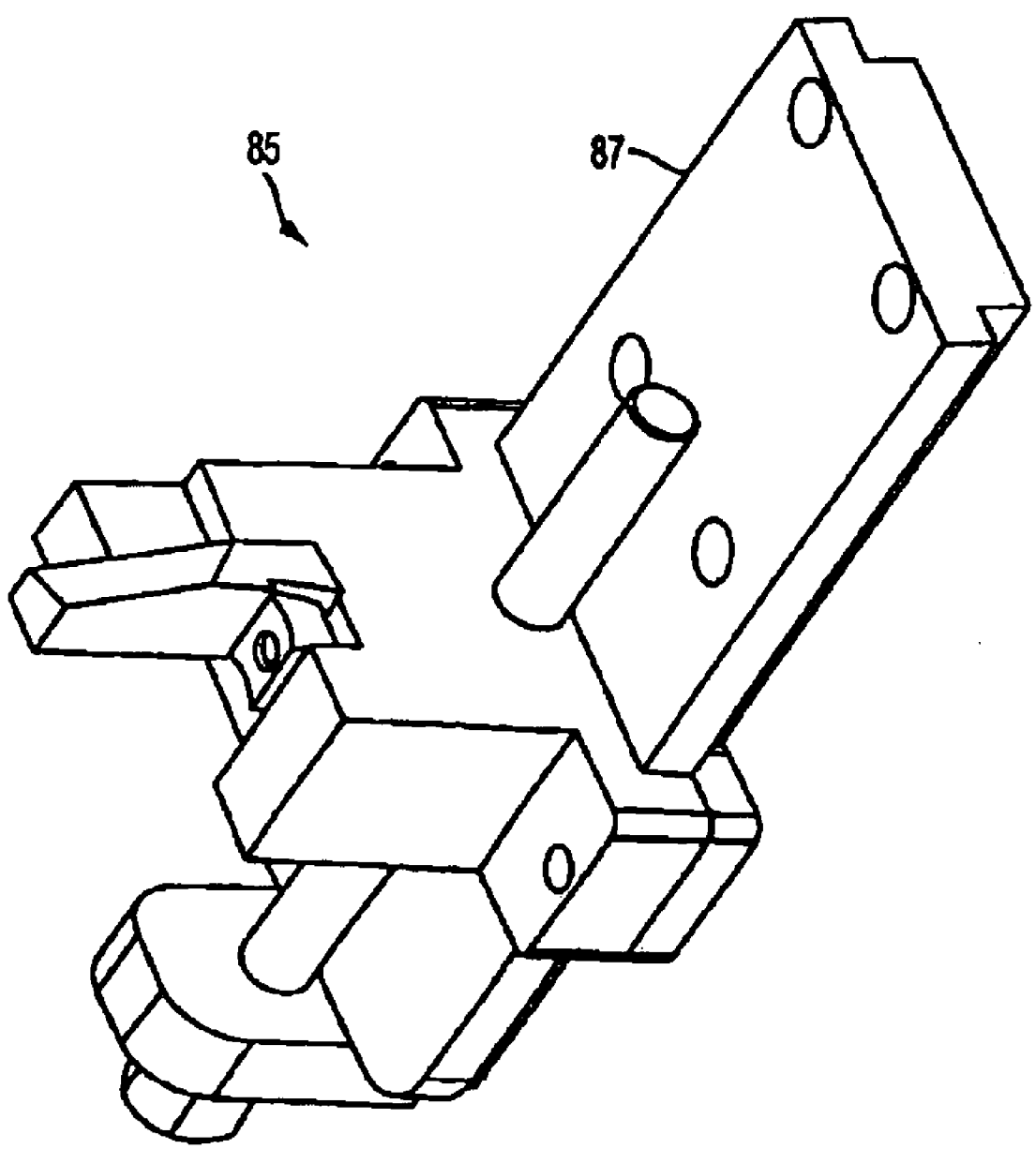
FIG. 6 is a perspective view of a boring tool assembly that can be used on the end prep tool, according to one embodiment of the present invention

The end prep tool 10 can also include other types of tool assemblies such as a boring tool assembly 85, as shown in FIG. 6, for machining the inside surface 4 of the pipe 2. One embodiment of the boring tool assembly 85 includes a base member 87 that can be mounted to the cutterhead 62 of the end prep tool 10 (see FIG. 4).

Figure 7:
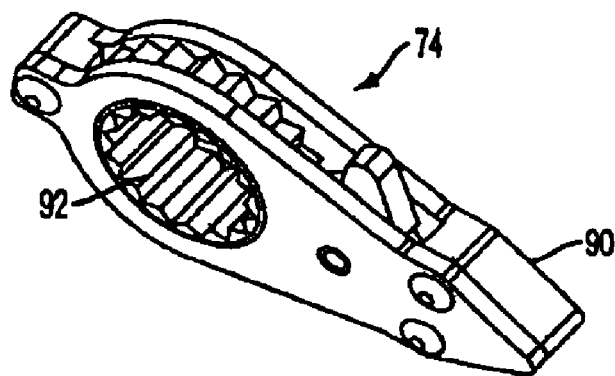
FIG. 7 is a perspective view of one embodiment of a ratchet mechanism used in the tool feed assembly shown in FIG. 5.
Figure 8:
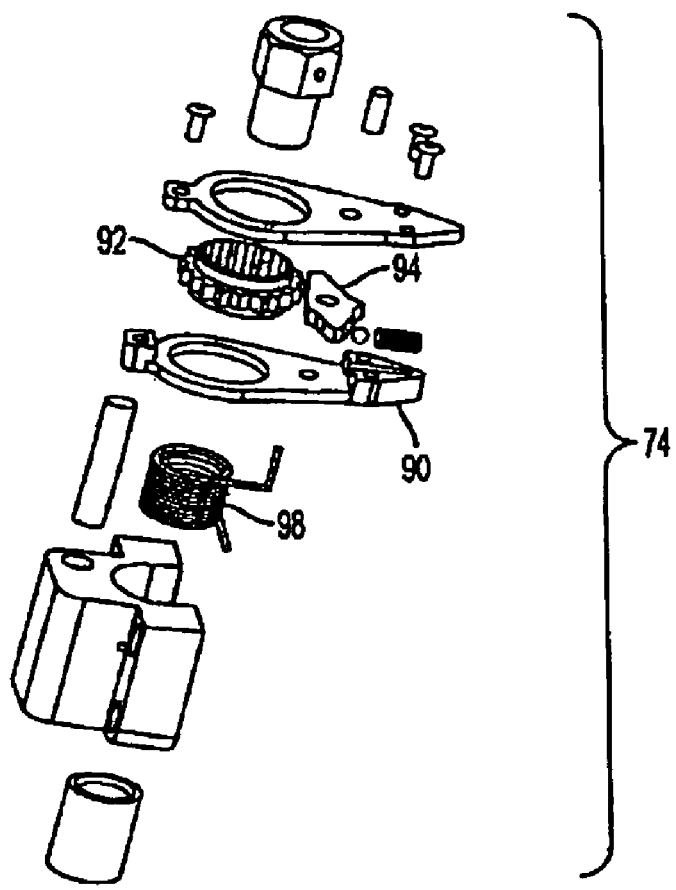
FIG. 8 is an exploded view of one embodiment of the ratchet mechanism used in the tool feed assembly shown in FIG. 5.

A ratchet mechanism 74 engages one end of the feed screw 76 for incrementally rotating the feed screw 76. One embodiment of the ratchet mechanism 74 is shown in greater detail in FIGS. 7 and 8. The exemplary ratchet mechanism 74 includes an arm 90 and ratchet teeth 92 coupled to the arm 90. The ratchet teeth 92 rotate together with the arm 90 when the arm 90 rotates in a first direction and the ratchet teeth 92 do not rotate when the arm 90 rotates freely in a second direction. The ratchet mechanism 74 further includes a release mechanism 94 that moves between an engaged position in which the ratchet teeth 92 are engaged and rotated by the arm 90 and a released position in which the ratchet teeth 92 are disengaged and move freely.

The arm 90 of the ratchet mechanism 74 extends through one side of the base member 70 such that the arm 90 engages one or more raised points 96 on the housing 60 as the tool rotates (see FIG. 4). When the ratchet arm 90 engages each raised point 96 during the rotation of the tool, the arm 90 moves in the first direction and rotates the ratchet teeth 92, causing the feed screw 76 to rotate, for example, about 0.004 turn. After the arm 90 rotates the feed screw 76, a spring or other biasing mechanism 98 returns the arm 90 in the second direction without rotating the feed screw 76. As a result, the tool feed carriage 72 is fed incrementally in a radial direction as the tool feed assembly 68 rotates. By engaging the release mechanism 94, the ratchet mechanism 74 can be released and the feed screw 76 can be rotated for a rapid return of the tool carriage 72.

When using the end prep tool 10, the mandrel assembly 64 is positioned within the tool mounting member 42 and clamps against the inside cylindrical surface 48 (FIG. 1). The mandrel assembly 64 is self-centering such that the rotational axis 14 of the tool 10 is substantially aligned with the longitudinal axis of the tool mounting member 42 and thus the theoretical center of the pipe 2. Once the tool 10 is securely mounted, the boring tool is used to machine or bore the inside surface 4 of the pipe 2, forming an inside surface with the desired roundness centered around the theoretical center of the pipe 2. The tool feed assemblies 68 are then used to cut the end face 8 of the pipe 2. As the tool feed assemblies 68 rotate, the tool holders 78 move radially and axially according to the predefined pattern and the cutting inserts 88 cut the end face of the pipe 2. The resulting cut has the predefined profile of the template 80 and also has the desired roundness and is concentric with the theoretical center of the pipe 2.

While the principles of the invention have been described herein, it is to be understood by those skilled in the art that this description is made only by way of example and not as a limitation as to the scope of the invention. Modifications and substitutions by one of ordinary skill in the art are considered to be within the scope of the present invention, which is not to be limited except by the following claims.

The invention claimed is:

1. A tool centering and mounting system for centering and internally mounting a tool at a theoretical center of a pipe, said system comprising:

a clamp cage including a central portion and at least three legs extending radially from said central portion, wherein at least one of said legs is radially adjustable;

a tool mounting member for adjustably mounting to said clamp cage, said tool mounting member including a substantially cylindrical inside surface; and a centering tool for removably mounting to said tool mounting member, said centering tool including a rotating arm having an rotational axis substantially aligned with a longitudinal axis of said cylindrical inside surface of said tool mounting member and a centering indicator at an end of said arm for indicating a relative distance of an inside surface of said pipe with respect to said longitudinal axis of said tool mounting member.

2. The system of claim 1 wherein said central portion of said clamp cage is substantially cylindrical with substantially concentric inside and outside surfaces and an end face substantially perpendicular to said inside and outside surfaces.

3. The system of claim 2 wherein at least part of said tool mounting member extends into said central portion of said clamp cage.

4. The system of claim 3 wherein said tool mounting member includes a collar around at least a portion of said tool mounting member, and wherein said collar of said tool mounting member is mounted to said end face of said central portion of said clamp cage.

5. The system of claim 4 wherein said tool mounting member includes a cylindrical portion and said collar extends around said cylindrical portion.

6. The system of claim 1 wherein two of said legs are fixed and correspond to a fixed radius.

7. The system of claim 4 wherein said end face of said central portion of said clamp cage includes holes for receiving mounting bolts, and wherein said collar includes oversized holes for receiving said mounting bolts to allow said tool mounting member to be adjusted before tightening said bolts.

8. A method of mounting a tool at a theoretical center of a pipe, said method comprising:

positioning a clamp cage inside of said pipe such that first and second legs of said clamp cage engage an inside surface of said pipe;

adjusting a third leg of said clamp cage against said inside surface of said pipe;

positioning a tool-mounting member within said clamp cage;

removably mounting a centering tool to said tool-mounting member;

measuring at least one relative distance from a longitudinal axis of said tool-mounting member to said inside surface of said pipe;

adjusting said tool mounting member until said longitudinal axis of said tool mounting member is substantially aligned with said theoretical center of said pipe;

mounting said tool mounting member to said clamp cage; and mounting a mandrel of said tool to said tool mounting member such that a rotational axis of said tool is substantially aligned with said theoretical center.

9. The method of claim 8 wherein said tool mounting member includes a substantially cylindrical surface, and wherein said mandrel is mounted and centered within said cylindrical inside surface.

10. The method of claim 8 wherein the step of measuring includes measuring multiple distances at multiple points on said inside surface of said pipe.

11. The method of claim 10 wherein said tool mounting member is adjusted in a radial direction after each measurement.

12. An end prep tool and mounting assembly for use with a pipe having a theoretical center, comprising:

a clamp cage including a central portion and at least three legs extending radially from said central portion, wherein at least one of said legs is radially adjustable to contact an inside surface of said pipe;

a tool mounting member including a substantially cylindrical inside surface, wherein said tool mounting member is adapted to mount to said clamp cage such that a longitudinal axis of said cylindrical inside surface is substantially aligned with said theoretical center of said pipe;

a centering tool for removably mounting to said tool mounting member, said centering tool including a rotating arm having an axis of rotation substantially aligned with a longitudinal axis of said cylindrical inside surface of said tool mounting member and a centering indicator at an end of said arm for indicating a distance of an inside surface of said pipe relative to said longitudinal axis of said tool mounting member; and an end prep tool for mounting within said cylindrical inside surface of said tool mounting member such that a rotational axis of said end prep tool is substantially aligned with said theoretical center of said pipe.

* * * * *